(12) United States Patent
Cha et al.

(10) Patent No.: US 11,511,660 B2
(45) Date of Patent: Nov. 29, 2022

(54) SYSTEM AND METHOD OF CONTROLLING SURROUNDING LAMP SYSTEM OF VEHICLE

(71) Applicants: Hyundai Motor Company, Seoul (KR); Kia Motors Corporation, Seoul (KR)

(72) Inventors: Dong Eun Cha, Gyeonggi-do (KR); Jin Ho Hwang, Chungcheongnam-do (KR); Sang Heon Lee, Seoul (KR); Julliana Cho, Seoul (KR); Jin Seok Seo, Seoul (KR); Byoung Oh Choi, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 251 days.

(21) Appl. No.: 16/884,821

(22) Filed: May 27, 2020

(65) Prior Publication Data

US 2021/0129741 A1    May 6, 2021

(30) Foreign Application Priority Data

Nov. 4, 2019    (KR) ......................... 10-2019-0139721

(51) Int. Cl.
| | | |
|---|---|---|
| *B60Q 1/24* | (2006.01) | |
| *B60R 25/01* | (2013.01) | |
| *B60R 25/24* | (2013.01) | |
| *B60R 25/30* | (2013.01) | |
| *B60Q 1/00* | (2006.01) | |

(Continued)

(52) U.S. Cl.
CPC ............. *B60Q 1/24* (2013.01); *B60Q 1/0035* (2013.01); *B60Q 1/2669* (2013.01); *B60R 25/01* (2013.01); *B60R 25/24* (2013.01); *B60R 25/305* (2013.01); *F21S 41/141* (2018.01); *F21S 41/663* (2018.01); *F21V 23/0478* (2013.01); *H05B 47/125* (2020.01); *F21W 2102/40* (2018.01); *F21Y 2115/10* (2016.08)

(58) Field of Classification Search
CPC ... B60Q 1/24; B60Q 1/26; B60Q 1/52; B60Q 1/268; B60Q 1/525; B60Q 1/2669
See application file for complete search history.

(56) References Cited

U.S. PATENT DOCUMENTS 6,894,608 B1 *    5/2005   Gunderson ........... G01S 15/931
                                                            340/471
10,504,369 B2 *  12/2019   Kodama ................ G08G 1/164
(Continued)

FOREIGN PATENT DOCUMENTS

| JP | 2002-211311 A | 7/2002 |
|---|---|---|
| JP | 2018-016291 A | 2/2018 |

(Continued)

*Primary Examiner* — Tung X Le
(74) *Attorney, Agent, or Firm* — Fox Rothschild LLP (57) ABSTRACT

A system and method of controlling a surrounding lamp system of a vehicle are provided. The method includes sensing an approach of the user to the vehicle acquiring an image of the user with respect to a vehicle body, when the user approaches the vehicle body. A motion of the user, the motion having directionality with respect to the vehicle body is determined from the image and a surrounding lamp is then operated based on the motion having directionality with respect to the vehicle body.

16 Claims, 5 Drawing Sheets

(51) Int. Cl.
*F21V 23/04* (2006.01)
*F21S 41/663* (2018.01)
*F21S 41/141* (2018.01)
*H05B 47/125* (2020.01)
*B60Q 1/26* (2006.01)
*F21Y 115/10* (2016.01)
*F21W 102/40* (2018.01)

(56) References Cited

U.S. PATENT DOCUMENTS

| | | | | |
|---|---|---|---|---|
| 2005/0062597 A1* | 3/2005 | Su | ............ | B60Q 1/381 340/475 |
| 2010/0277270 A1* | 11/2010 | Aikens | ............ | G05B 19/042 340/3.7 |
| 2011/0115375 A1* | 5/2011 | Shiratsuchi | ............ | B60Q 3/80 315/77 |
| 2012/0056734 A1* | 3/2012 | Ikeda | ............ | G08G 1/165 340/425.5 |
| 2019/0180521 A1* | 6/2019 | Miller | ............ | B60W 10/20 |

FOREIGN PATENT DOCUMENTS

| | | |
|---|---|---|
| KR | 2015-0145294 A | 12/2015 |
| KR | 10-2017-0005560 A | 1/2017 |

\* cited by examiner

SYSTEM AND METHOD OF CONTROLLING SURROUNDING LAMP SYSTEM OF VEHICLE

CROSS REFERENCE TO RELATED APPLICATION

The present application claims priority of Korean Patent Application No. 10-2019-0139721 filed on Nov. 4, 2019, the entire contents of which is incorporated herein for all purposes by this reference.

BACKGROUND

Field of the Disclosure

The present disclosure relates to a technology for controlling a lamp system of a vehicle, and more particularly, to a surrounding lamp system provided on a vehicle body that is driven more interactively based on a user's motion.

Description of the Related Art

In addition to the basic role as a lamp of illuminating the area around a vehicle in the conventional lamp of the vehicle, in recent years, additional functions, such as performing a welcome function by the operation which is turned on when the user approaches, are being developed. Furthermore, in the future era of autonomous vehicles, the space within the vehicle will be able to be variably and actively connected and controlled. Various lamp devices mounted to generate light in the vehicle may help to meet such demands by more interactive action with the user.

The foregoing explained as the background is intended merely to aid in the understanding of the background of the present disclosure, and is not intended to mean that the present disclosure falls within the purview of the related art that is already known to those skilled in the art.

SUMMARY

An object of the present disclosure is to provide a system and method of controlling a surrounding lamp system of a vehicle, which allows a surrounding lamp system provided on a vehicle body to be driven more interactively based on a user's motion, thereby forming a user interface which provides a luxurious and intelligent image of the vehicle.

A method of controlling a surrounding lamp system of a vehicle according to the present disclosure may include sensing an approach of the user to the vehicle; acquiring an image of the user with respect to the vehicle body, when the user approaches the vehicle; determining a motion of the user having directionality with respect to the vehicle body from the image; and operating a surrounding lamp based on the motion having directionality with respect to the vehicle body.

In particular, the controller may be configured to sense the user's approach by detecting whether a user recognition body of the user approaches the vehicle body based on a signal of a contactless receiver provided within a vehicle. The controller may configured to acquire the image of the user approaching a vehicle using a camera mounted within the vehicle, and determine the motion of the user from a plurality of images acquired continuously. The controller may then be configured to determine the motion having directionality with respect to the vehicle body as the left movement or the right movement of the user with respect to the vehicle body.

When determining the user's motion having directionality with respect to the vehicle body, the controller may be configured to turn on at least one sector adjacent to the user among sectors of the surrounding lamp along the moving direction of the user. The controller may be configured to determine the moving speed of the user to adjust the speed at which the sector of the surrounding lamp is turned on based on the moving speed of the user. When the motion is stopped, the controller may be configured to turn off the surrounding lamp. In particular, when the motion of the user is stopped, the controller may be configured to turn off the surrounding lamp after a predetermined reference time has elapsed.

Additionally, the controller may allow all the sectors of the surrounding lamp turned on based on the user's movement with respect to the vehicle body to continuously maintain the turned-on state, until the user's motion is stopped and the surrounding lamp is entirely turned off. The controller may be configured to sequentially turn off the sectors in the rear, through which the user has passed, among the sectors of the surrounding lamp turned on according to the user's movement with respect to the vehicle body. The controller may further be configured to determine the moving speed of the user to adjust the speed at which the sector of the surrounding lamp is turned off based on the moving speed of the user.

When the user approaches the exterior of the vehicle body, the controller may be configured to turn on at least one sector adjacent to the user among the sectors of the surrounding lamp. When determining the user's motion having directionality with respect to the vehicle body, the controller may be configured to turn on at least one neighboring sector from the turned-on sector of the surrounding lamp along the moving direction of the user. Additionally, the controller may be configured to determine the moving speed of the user to adjust the speed at which the sector of the surrounding lamp is turned on based on the moving speed of the user. When the user's motion is stopped, the controller may be configured to turn off the surrounding lamp after a predetermined reference time has elapsed.

The controller may allow all the sectors of the surrounding lamp turned on according to the movement of the user with respect to the vehicle body to continuously maintain the turned-on state, until the user's motion is stopped and the surrounding lamp is entirely turned off. The controller may be configured to sequentially turn off the sectors in the rear, through which the user has passed, among the sectors of the surrounding lamp turned on based on the movement of the user with respect to the vehicle body. The controller may also be configured to determine the moving speed of the user to adjust the speed at which the sector of the surrounding lamp is turned off based on the moving speed of the user.

A method of controlling a surrounding lamp system of a vehicle according to the present disclosure may include sensing the door closing of a vehicle body; and operating sectors located on the surface of the closed door among sectors of the surrounding lamp to flash, when the door closing of the vehicle body is detected. In addition to the sectors located on the surface of the closed door, the controller may be configured to operate sectors of the surrounding lamp of at least some sections, which are adjacent to the door, to flash together. In particular, the controller may be configured to operate the sectors to output a flash of the surrounding lamp multiple times.

The present disclosure may allow the surrounding lamp system provided on the vehicle body to be driven more interactively based on the motion of a user, thereby forming the user interface for providing the luxurious and intelligent image of the vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
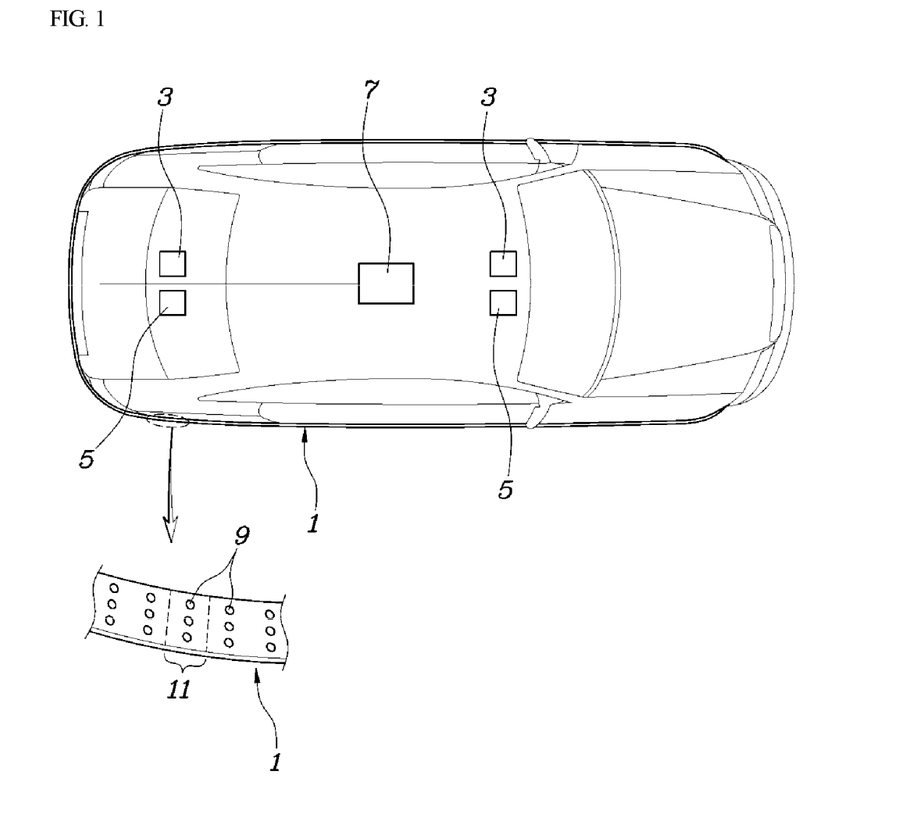
FIG. 1 is a diagram showing a configuration of a vehicle having a surrounding lamp system according to an exemplary embodiment of the present disclosure.

FIG. 1 is a configuration diagram of a vehicle having a surrounding lamp system of a vehicle to which the present disclosure may be applied, and the surrounding lamp system of the vehicle may include a surrounding lamp 1 provided in a vehicle body, at least one low frequency (LF) antenna 3 provided in a vehicle and configured to sense a motion of a user located outside the vehicle, at least one camera 5 (or other imaging device) provided in the vehicle to photograph or capture an image of a user outside the vehicle, and a controller 7 configured to operate the surrounding lamp 1 based on signals of the LF antenna 3 and the camera 5.

The surrounding lamp 1 may include a plurality of light emitting devices 9 (e.g., light emitting diodes (LEDs)) arranged along the vehicle body at intervals which allow a user located outside the vehicle body to recognize whether at least the adjacent light emitting device 9 is turned on. Such arrangement of the light emitting devices 9 may be classified into sectors at regular intervals. For reference, although the plurality of light emitting devices 9 may also be included in one sector, one light emitting device 9 may be classified into one sector to be operated by the controller 7. In other words, here, the sector of the surrounding lamp 1 refers to at least one series of light emitting devices 9 arranged along the circumferential direction of the vehicle body.

In addition, the light emitting device 9 of the surrounding lamp 1 is not limited to indicating that only one row is formed along the circumferential direction of the vehicle body, and a plurality of rows may be arranged along the circumferential direction of the vehicle body to form the surrounding lamp 1, such that, for example, as shown in FIG. 1, when the sector is classified in the minimum unit in the case where the surrounding lamp 1 includes three rows of light emitting devices 9 along the circumferential direction of the vehicle, one sector 11 may include three light emitting devices 9 forming one column.

Figure 2:
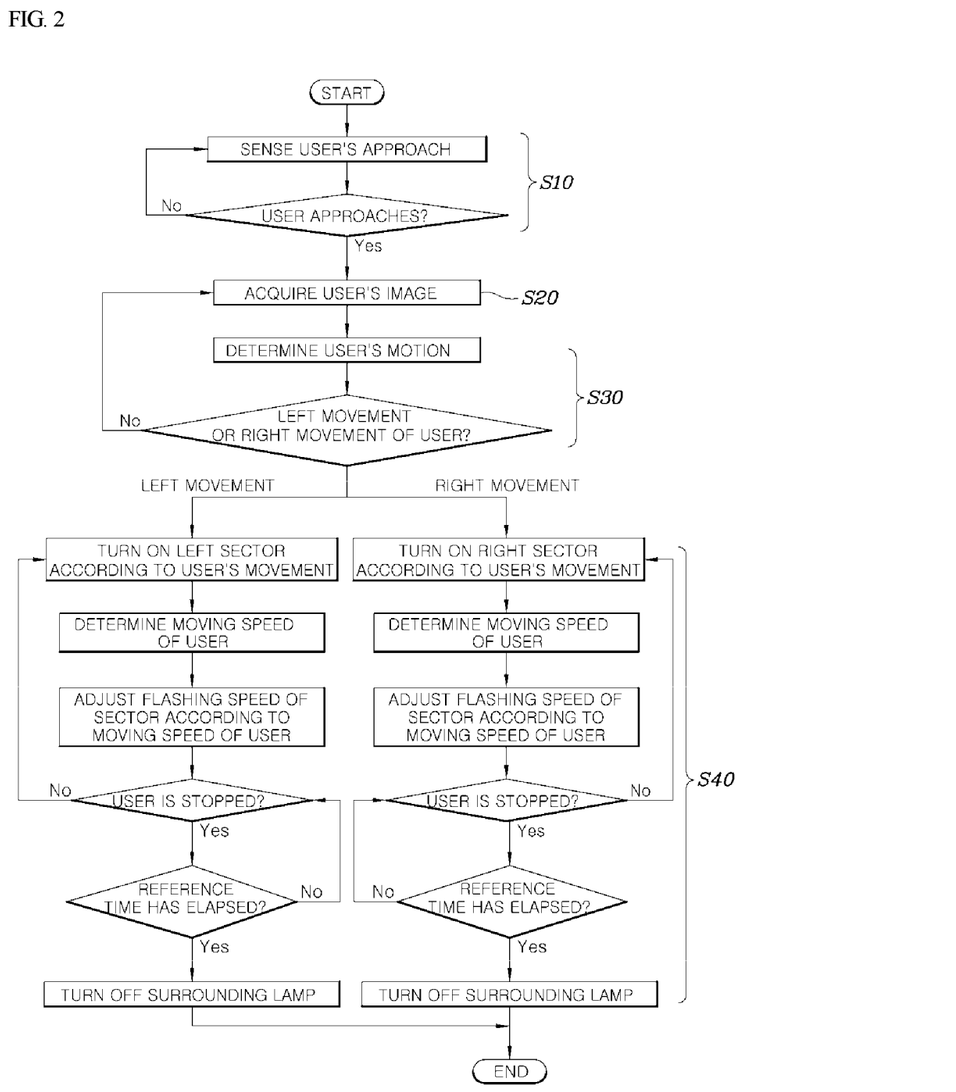
FIG. 2 is a flowchart showing a method of controlling the surrounding lamp system of the vehicle according to an exemplary embodiment of the present disclosure.

Referring to FIG. 2, an exemplary embodiment of a method of controlling the surrounding lamp 1 system of the vehicle according to the present disclosure may include sensing an approach of a user to the exterior of the vehicle (S10); acquiring an image of the user with respect to the vehicle body when the user approaches the vehicle body (S20); determining a motion of the user, the motion having directionality with respect to the vehicle body from the image (S30); and operating the surrounding lamp 1 based on the user's directional motion with respect to the vehicle body (S40). Notably, the method described herein may be executed by a controller.

In other words, in the present disclosure, when a user approaches a vehicle to form the directional motion with respect to the vehicle body, the controller 7 may be configured to operate the surrounding lamp 1 to produce a luxurious and intelligent image on the exterior of the vehicle body interactively with respect to the user's motion (e.g., produce an aesthetically pleasing image).

Further, the controller 7 may be configured to detect whether the user recognition body (e.g., user terminal) possessed by the user approaches the vehicle based on a signal of a contactless receiver mounted within the vehicle, thereby sensing the user's approach. In particular, the user recognition body may refer to all media capable of providing information which may prove as being a legitimate user of the vehicle (e.g., provides authentication as to user identity/authority for vehicle use), such as a conventional smart key or a smartphone registered by the user. The contactless receiver refers to all devices capable of recognizing the presence of the user recognition body by approaching the vehicle body without contacting the user recognition body, and may include the LF antenna 3, accessories thereof, and the like.

Moreover, the controller 7 may be configured to acquire the image of the user approaching the vehicle using the camera 5 mounted in the vehicle, and to determine the motion of the user from a plurality of images acquired continuously. In other words, the controller 7 may be configured to analyze the images acquired from the camera 5 to determine the user's motion with respect to the vehicle body. A plurality of cameras 5 may be installed in the vehicle to continuously acquire the images in all directions outside the vehicle body.

In particular, the controller 7 may be configured to determine the user's motion having directionality with respect to the vehicle body as the left movement or the right movement of the user with respect to the vehicle body. In other words, when the user approaches the exterior of the vehicle body as described above, the controller 7 may be configured to detect the user's approach through the LF antenna 3 and accessories thereof, and operate the camera 5 to determine the user's motion with respect to the vehicle body. The user's motion is for the user to approach the vehicle body, and the controller 7 may be configured to determine whether the user moves to the right or to the left from the recognized location. In other words, using image analysis, the controller 7 may be configured to determine a movement of the user with respect to the vehicle body.

Figure 3:
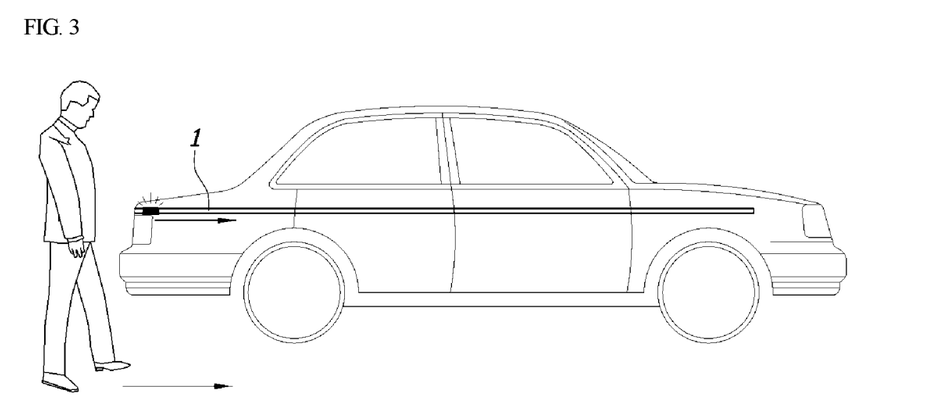
FIG. 3 is a diagram illustrating an operation of the surrounding lamp system according to a user's motion according to an exemplary embodiment of the present disclosure.

In response to determining the user's motion having directionality with respect to the vehicle body, the controller 7 may be configured to turn on at least one sector adjacent to the user among the sectors of the surrounding lamp 1 according to the user's movement direction. In other words, when the user moves to the right with respect to the vehicle body, the controller 7 may be configured to turn on the sectors of the surrounding lamp 1 to sequentially turn on the surrounding lamp 1 while following the user (e.g., sequentially turned on in the movement direction of the user as the user moves in a detected direction to illuminate a path along which the user is moving). At this time, the controller 7 may be configured to determine the moving speed of the user to adjust the speed at which the sector of the surrounding lamp 1 is turned on according to the moving speed of the user to be almost synchronized with the user's motion. Accordingly, the sectors may be turned on in both the same direction as the moving path of the user as well as at the same path such that a user experiences that the lights are illuminating together with the user's movement.

The controller 7 may be configured to turn off the surrounding lamp 1 when the user's motion is stopped. In particular, when the user's motion is stopped, the controller 7 may be configured to immediately turn off all the sectors of the surrounding lamp 1, but after the user's motion is stopped, the surrounding lamp 1 may be allowed to be turned off after a predetermined reference time, thereby producing a softer feeling. Accordingly, the reference time may be set to, for example, a time within a few seconds according to the production intention described above.

The controller 7 may be configured to allow all the sectors of the surrounding lamp 1 turned on according to the user's movement with respect to the vehicle body to continuously maintain the turned-on state, until the user's motion is stopped and the surrounding lamp 1 is entirely turned off. In other words, in response to sensing that the user is approaching the vehicle and the user moves along the circumference of the vehicle body and the surrounding lamp 1 starts to be turned on from any sector thereof, the controller 7 may be configured to turn on the adjacent sectors sequentially as the user moves and the sectors in the rear, through which the user has passed, may also be maintained turned on and then may be turned off together, when the user is stopped and all the sectors of the surrounding lamp 1 are turned off as described above.

Meanwhile, unlike the foregoing, the controller 7 may be configured to sequentially turn off the sectors in the rear, through which the user has passed, among the sectors of the surrounding lamp 1 turned on according to the user's movement with respect to the vehicle body. In particular, when the user moves along the circumference of the vehicle body, only the sectors around the user among the sectors of the surrounding lamp 1 may be sequentially turned on and then turned off, thereby producing the scene in which only the local sectors of the surrounding lamp 1 emit light according to the user's movement. In other words, as the user passes by sectors, the sectors behind the user may be turned off while the sectors in the user's path are turned on. Accordingly, the controller 7 may be configured to determine the moving speed of the user to adjust the speed at which the sector of the surrounding lamp 1 is turned off according to the moving speed of the user, thereby producing the situation such as turning off light while leaving afterglow behind the user according to the user's motion.

Figure 4:
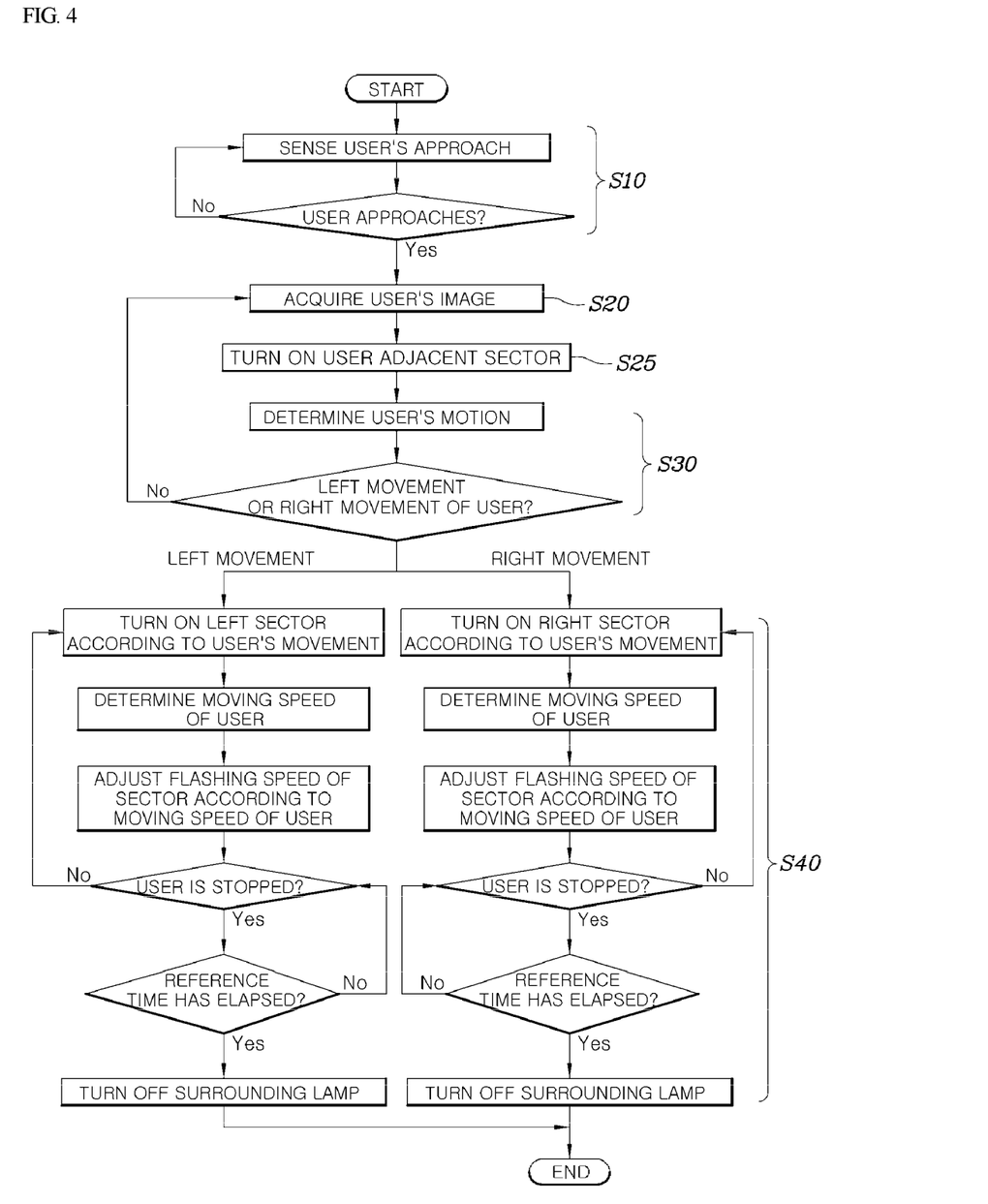
FIG. 4 is a flowchart showing a method of controlling the surrounding lamp system of the vehicle according to another exemplary embodiment of the present disclosure.

Meanwhile, FIG. 4 shows another exemplary embodiment of the present disclosure, and all configurations are substantially the same as those of the exemplary embodiment of FIG. 2 except that the controller 7 may be configured to turn on at least one sector adjacent to the user among the sectors of the surrounding lamp when the user approaches the exterior of the vehicle body (S25). In other words, in response to sensing the user's approach to the exterior of the vehicle through the contactless receiver such as the LF antenna 3 and accessories thereof, the controller 7 may be configured to operate the camera 5 to determine the user's location with respect to the vehicle body, and first turn on the sector adjacent to the user among the sectors of the surrounding lamp 1.

Subsequently, when determining the user's movement having directionality with respect to the vehicle body, the controller 7 may be configured to turn on at least one neighboring sector from the turned-on sector of the surrounding lamp along the moving direction of the user. Even in this case, the controller 7 may be configured to determine the moving speed of the user to adjust the speed at which the sector of the surrounding lamp 1 is turned on based on the moving speed of the user to be almost synchronized with the user's motion, thereby producing the state where the sectors are turned on to enable a more interactive production.

When the user's motion is stopped, the controller 7 may be configured to turn off the surrounding lamp 1 after a predetermined reference time has elapsed. Even in this case, the reference time may be appropriately set within several seconds so that the surrounding lamp 1 is turned off at an appropriate time. The controller 7 may be configured to allow all the sectors of the surrounding lamp 1 turned on according to the user's movement with respect to the vehicle body to continuously maintain the turned-on state, until the user's motion is stopped and the surrounding lamp 1 is entirely turned off. Alternatively, the controller 7 may also be configured to sequentially turn off the sectors in the rear, through which the user has passed, among the sectors of the surrounding lamp 1 turned on according to the user's movement with respect to the vehicle body, and likewise, also configured to adjust the speed at which the sector of the surrounding lamp 1 is turned off according to the moving speed of the user.

Figure 5:
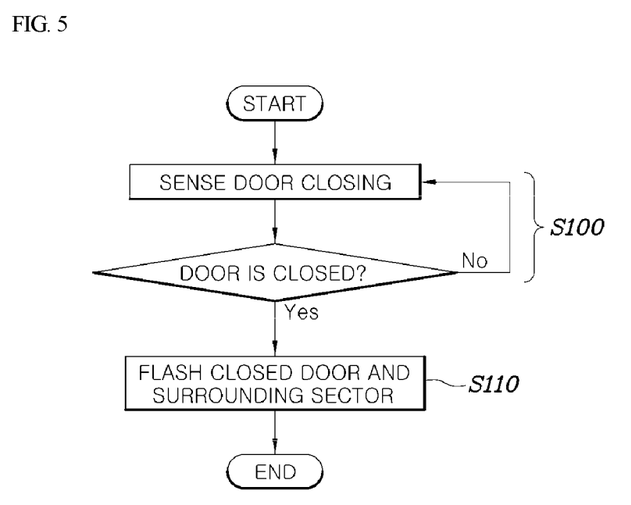
FIG. 5 is a diagram showing a method of controlling the surrounding lamp system when a door of the vehicle body is closed according to an exemplary embodiment of the present disclosure.

Meanwhile, referring to FIG. 5, an exemplary embodiment of the present disclosure is configured to include sensing, by the controller, the door closing of the vehicle body (S100); and operating the sectors located on the surface of the closed door among the sectors of the surrounding lamp to flash, when the door closing of the vehicle body is sensed (S110). In other words, when the door of the vehicle body is closed, the controller may be configured to operate the sectors of the surrounding lamp provided on the closed door to flash.

In addition to the sectors located on the surface of the closed door, the controller may be configured to operate the sectors of the surrounding lamp of at least some sections, which are adjacent to the door, to flash together. For example, it may also be possible to implement all sectors of the side surface of the vehicle body to which the closed door belongs to flash together. The controller may allow the sectors of the surrounding lamp to flash multiple times. For example, the controller may allow the sectors of the surrounding lamp to flash about two times after the door has been closed.

While an exemplary embodiment of the present disclosure has been shown and described, it will be apparent to those skilled in the art that the present disclosure may be variously improved and changed without departing from the technical spirit of the present disclosure provided by the following claims.

What is claimed is:

1. A method of controlling a surrounding lamp system of a vehicle, comprising:
   sensing, by a controller, an approach of a user to the vehicle;
   acquiring, by the controller, an image of the user with respect to a vehicle body, in response to sensing the approach of the user;
   determining, by the controller, a motion of the user, the motion having directionality with respect to the vehicle body from the image;
   operating, by the controller, a surrounding lamp according to the motion having directionality with respect to the vehicle body; and
   in response to determining the motion having directionality with respect to the vehicle body turning on, by the controller, at least one sector adjacent to the user among sectors of the surrounding lamp along the moving direction of the user; and
   determining, by the controller, the moving speed of the user to adjust the speed at which the sector of the surrounding lamp is turned on according to the moving speed of the user.

2. The method according to claim 1, wherein sensing the approach of the user includes recognizing whether a user recognition body possessed by the user approaches the vehicle body based on a signal of a contactless receiver mounted within the vehicle.

3. The method according to claim 1, wherein the controller is configured to acquire the image of the user approaching the vehicle body with a camera provided in the vehicle, and to determine the motion of the user from a plurality of images acquired continuously.

4. The method according to claim 1, wherein the controller is configured to determine the motion of the user having directionality with respect to the vehicle body as the left movement or the right movement of the user with respect to the vehicle body.

5. The method according to claim 4, further comprising:
   in response to sensing that the user approaches the vehicle, turning on, by the controller, at least one sector adjacent to the user among the sectors of the surrounding lamp.

6. The method according to claim 5, further comprising:
   in response to determining the motion having directionality with respect to the vehicle body, turning on, by the controller, at least one neighboring sector from the turned-on sector of the surrounding lamp along the moving direction of the user.

7. The method according to claim 6, further comprising:
   determining, by the controller, the moving speed of the user to adjust the speed at which the sector of the surrounding lamp is turned on according to the moving speed of the user.

8. The method according to claim 6, further comprising:
   in response to determining that the motion of the user is stopped, turning off, by the controller, the surrounding lamp after a predetermined reference time has elapsed.

9. The method according to claim 6, wherein the controller allows all the sectors of the surrounding lamp turned on according to the movement of the user with respect to the vehicle body to continuously maintain an turned-on state, until the motion of the user is stopped and the surrounding lamp is entirely turned off.

10. The method according to claim 6, further comprising:
    sequentially turning off, by the controller, the sectors in the rear, through which the user has passed, among the sectors of the surrounding lamp turned on according to the movement of the user with respect to the vehicle body.

11. The method according to claim 10, further comprising:
    determining, by the controller, the moving speed of the user to adjust the speed at which the sector of the surrounding lamp is turned off according to the moving speed of the user.

12. The method according to claim 1, further comprising:
    in response to determining that the motion of the user is stopped, turning off, by the controller, the surrounding lamp.

13. The method according to claim 12, further comprising:
    in response to determining that the motion of the user is stopped, turning off, by the controller, the surrounding lamp after a predetermined reference time has elapsed.

14. The method according to claim 1, wherein the controller allows all the sectors of the surrounding lamp, which have been turned on according to the movement of the user with respect to the vehicle body, to continuously maintain a turned-on state, until the motion of the user is stopped and the surrounding lamp is entirely turned off.

15. The method according to claim 1, further comprising:
sequentially turning off, by the controller, the sectors in the rear, through which the user has passed, among the sectors of the surrounding lamp turned on according to the movement of the user with respect to the vehicle body.

16. The method according to claim 15, further comprising:
determining, by the controller, the moving speed of the user to adjust the speed at which the sector of the surrounding lamp is turned off according to the moving speed of the user.

* * * * *